United States Patent [19]
Ferrone

[11] Patent Number: 5,421,691
[45] Date of Patent: Jun. 6, 1995

[54] ROLL TRANSFER DEVICE

[76] Inventor: Rock A. Ferrone, 1885 Main St., Pittsburgh, Pa. 15215

[21] Appl. No.: 35,476

[22] Filed: Mar. 23, 1993

[51] Int. Cl.$^6$ .................... B65H 19/12; B60P 1/34
[52] U.S. Cl. .................... 414/546; 242/559.1; 242/559.4; 414/911
[58] Field of Search .......... 242/58.6, 79, 54 R, 242/86.5 R, 559.1, 559.4, 561; 414/911, 910, 908, 597, 684, 546

[56] References Cited

U.S. PATENT DOCUMENTS

| | | | |
|---|---|---|---|
| 764,344 | 7/1904 | Buckelew | 414/684 |
| 852,217 | 4/1907 | Brust et al. | |
| 915,721 | 3/1909 | Aldous | |
| 1,870,225 | 8/1932 | Berry | |
| 1,921,233 | 8/1933 | Kuchar | 414/546 X |
| 2,560,463 | 7/1951 | Matson | 414/546 |
| 2,799,415 | 7/1957 | Dean, Jr. | |
| 3,120,358 | 2/1964 | Ensley | 242/58.6 X |
| 3,279,753 | 10/1966 | Ventriglio et al. | |
| 3,880,372 | 4/1975 | Witte | |
| 3,937,414 | 2/1976 | Devine | 242/86.5 R |
| 4,132,371 | 1/1979 | Byrt | |
| 4,266,903 | 5/1981 | Surbrook | 414/428 |
| 4,354,793 | 10/1982 | Perry | 414/546 |
| 4,373,854 | 2/1983 | Schultheis | 414/742 |
| 4,431,362 | 2/1984 | Wech, Jr. et al. | 414/685 |
| 4,447,012 | 5/1984 | Woodruff | 242/54 R |
| 4,701,098 | 10/1987 | Bills et al. | 414/502 |
| 4,720,231 | 1/1988 | Pienta | 414/560 |
| 4,934,413 | 6/1990 | Yao | 242/58.6 |

Primary Examiner—John M. Jillions
Attorney, Agent, or Firm—Webb Ziesenheim Bruening Logsdon Orkin & Hanson

[57] ABSTRACT

A device for transferring paper rolls to and from a printing press includes a wheeled frame having a low profile configuration to permit entry into a confined space between adjacent roll stand in a bottom loading, community style web press. A pair of upright support members are attached to the moveable frame and each support member carries a roll shaft holder. A pair of arms are pivotally attached to the support members and are simultaneously moved by a hydraulic drive system. The arms are adapted to lift a paper roll by engaging the paper roll shaft. As the arms are raised, the roll rotatably moves along the arms to place the roll shaft in the holders on the upright support members. The arms are moved to a nearly vertical position in order to clear the structure of the press stand when the roll transfer device is moved into and out of the confined space between the presses. The arms also each include a rear segment for lifting the roll shaft from the holders when the arms are lowered to position the paper roll in a roll stand of a press.

10 Claims, 4 Drawing Sheets

ROLL TRANSFER DEVICE

Be it known that I, Rock A. Ferrone, citizen of the United States and residing at 1885 Main Street, Pittsburgh, Pa. 15215, have invented certain new and useful improvements in a ROLL TRANSFER DEVICE of which the following is a specification.

BACKGROUND OF THE INVENTION

The present invention relates generally to lifting devices and, more particularly, to a device suitable for transferring paper rolls for loading and subsequent removal in the roll stand of a printing press. The invention is particularly useful for transferring paper rolls in a so-called community style web press in which a plurality of printing presses are arranged in a series and wherein the paper rolls are loaded at the bottom of the roll stands. Such community style web presses are widely used and are manufactured, for example, by the Goss Division of Rockwell Manufacturing Company, among others. In such a community style press array, loading is somewhat more difficult because the paper rolls are loaded in the bottom of the roll stand and the spacing between adjacent presses in the line is rather confined.

Heretofore, full paper rolls have been loaded in a roll stand simply by rolling the paper rolls on the floor and up a slight inclined ramp to enter the roll stand. This loading of full rolls is not extremely difficult because the mill stand roll shaft seat is at an elevation nearly the same as the vertical shaft height of a full paper roll. Loading problems occur, however, whenever it is necessary to load a partially spent roll, such as a half roll. In such cases, it is necessary to raise the roll shaft and roll ten inches or more for loading purposes. It has been necessary to use lifting aids, such as pry bars to move and lift the partial rolls into the roll stand. It is particularly difficult to enter and manipulate a paper roll for loading and unloading purposes in these bottom loading roll stand presses since overhead cranes cannot access such spaces. It is particularly burdensome and oftentimes dangerous for the print shop workers who must maneuver and lift the paper rolls into a loading position. A typical full paper roll may weigh in the 1,000–1,400 pound range while a partial roll may weigh 500–1,000 pounds, for example. Lower back and crushing type injuries are not at all uncommon. A variety of injuries are also caused by slipping pry bars. Grease and oil sometimes accumulate beneath the roll stands which causes the tip of the pry bar to slip quite easily thus making this task even more difficult and injury prone.

The present invention solves the problems heretofore encountered in maneuvering and lifting paper rolls between adjacent press stations for transferring rolls in a community press operation. The present invention provides a wheeled roll transfer device which is capable of lifting a paper roll from the floor and moving the roll between adjacent presses for subsequent delivery of the roll to the roll stand of the printing press. This is accomplished without the need for any manual handling of the paper roll. In addition, the device of the invention is suitable for use in loading or removing a partially spent paper roll from the roll stand of the press in a like manner without the need for pry bars. The compact frame profile and articulation of the lifting arms provided by the device of the invention permits unrestricted movement into and from the confined space between adjacent presses.

SUMMARY OF THE INVENTION

Briefly stated, the roll transfer device of the present invention includes a wheeled frame having a compact profile to allow entry and exit between adjacent printing press structures. A pair of upright support housings are attached to the frame and spaced apart a distance slightly greater than a maximum expected paper roll width. A transverse beam member of the frame extends between the two upright support housings at a lower end thereto to structurally join the housings. Each of the upright support housings has a V-shaped notch formed at an upper surface for receiving and holding the shaft of a paper roll thereon. A support arm is pivotally mounted to each of the upright housings on separate stub shafts positioned beneath and forward of each of the V-shaped notches. The support arms each have a rear segment extending rearwardly from the mounting shaft and each includes a vertically raised stop lug portion at the rear segment and at the forward end. The upper edges of each of the support arms preferably have a rubber layer attached thereto. A hydraulic motor and electric pump are provided on one side of the frame for driving a main gear which, in turn, drives the shafts of the pair of support arms. The drive motor is coupled to the more distant support arm by a rotatable drive shaft extending between the upright support housings positioned within the aforementioned transverse beam. The motor driven support arms move simultaneously from a lowered, roll pick-up position to a raised, transport position. In the roll pick-up position, the support arms are lowered to the elevation of the paper roll shaft. The roll transfer device is rolled toward the paper roll such that the arms span the roll and are located beneath the roll shaft. The arms are then raised to engage the roll shaft. As the arms are moved past a horizontal position, the roll shaft rolls along the rubber surface thereof until the shaft engages the front surface portions of the upright support housings. After the arms move slightly above the horizontal position, the roll shaft moves into the V-shaped notches, where the paper roll is securely held for transport purposes. The arms are then raised to a more vertical transport position of at least about 60° so that the arms do not contact any of the adjacent press structures when the device is moved into or away from the confined space. In the loading mode, a paper roll previously placed in the V-shaped notches is moved between adjacent presses with the arms in the raised position of at least 60'. The arms are then lowered, causing the aforementioned rear segments of the arms to raise and lift the roll shaft out of the V-shaped notches and onto the arms. The rear stop lugs at the ends of the rear segments assure that the shaft is engaged and lifted. The paper roll shaft then rotates along the arms on the rubber layer thereof. The rubber material provides a higher coefficient of friction for the roll shaft than bare metal, thus providing controlled movement of the roll and preventing sliding, shifting or slipping of the roll. The paper roll is then delivered to a roll seating area of the roll stand of the press. After the roll is delivered to the roll stand, the device is backed away from the roll stand, the arms are then raised and the device is withdrawn.

DETAILED DESCRIPTION OF THE INVENTION

Figure 1:
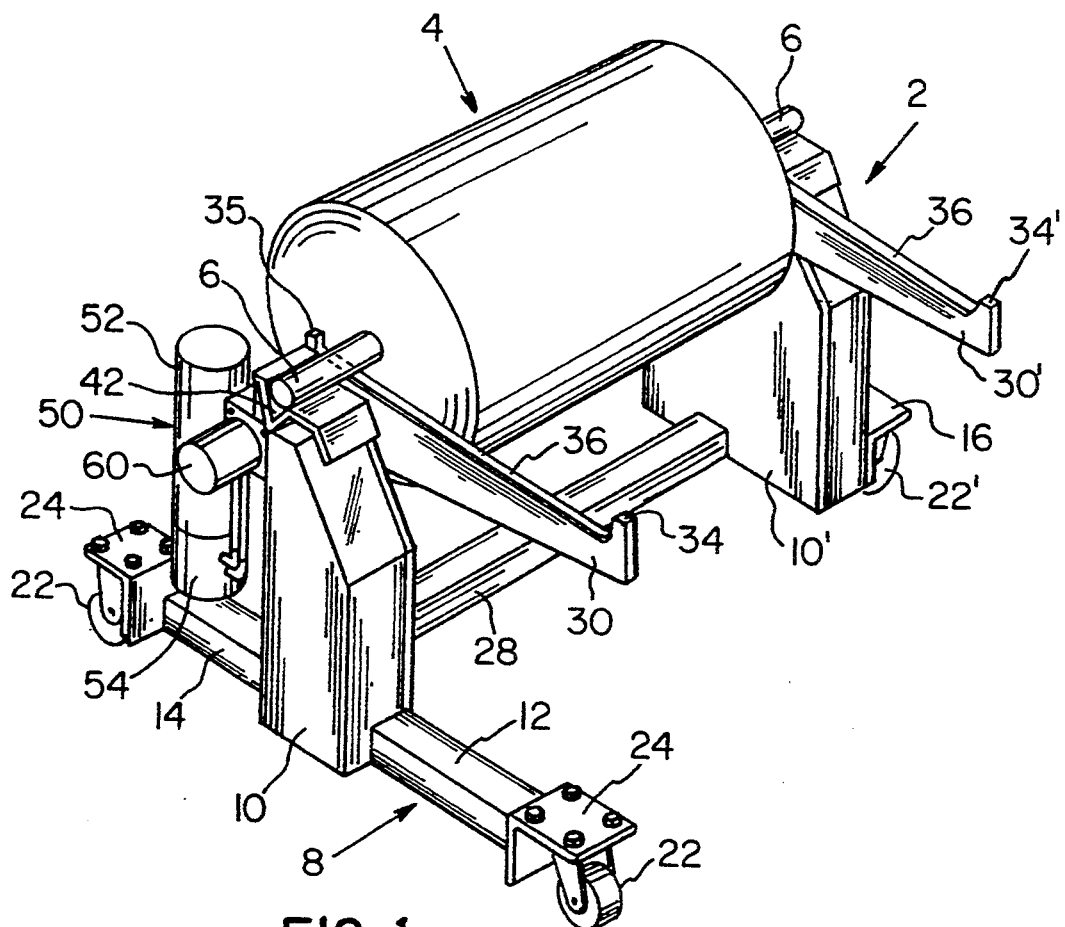
FIG. 1 is a perspective view of the paper roll transfer device of the invention depicting a paper roll in place thereon.

Reference is now made to the drawings wherein the same elements are identified by identical numbers and similar elements are identified by primed numbers throughout the various views. The roll transfer device, generally designated by reference numeral 2, is depicted in FIG. 1 with a paper roll 4 mounted for transport thereon. The paper roll 4 has an axially aligned roll shaft 6 with end portions outwardly extending on opposite sides thereof, which are supported on the device 2 for transport purposes, as will be discussed in greater detail hereinafter. A typical paper roll may have a width upwards of 36 inches and a diameter up to about 52 inches. The roll shaft 6 has an overall length of about five feet. A full paper roll 4 typically can weigh upwards of 1,400 pounds. Partially spent rolls are also transferred to and from the presses and these naturally are smaller in paper diameter but still may possess considerable weight. As stated above, the partially spent rolls have caused most of the loading problems in the past due to their various undersized roll dimensions. This, of course, is of no consequence to the instant invention since the device 2 is capable of picking up rolls of any diameter as will be explained hereinafter.

The roll transfer device 2 includes a moveable frame 8 which carries a pair of upright support housings 10. The upright housings 10 are spaced apart a distance slightly greater than the width of the paper roll 4. The frame 8 includes an elongated outrigger beam having extended end portions 12 and 14 on the left-hand side or aisle side of the device 2, as viewed in FIG. 1. The right-hand side or far side of the frame 8 has a shortened frame segment 16 which is necessary for the side of the frame 8 to clear the protruding bottom portion 18 of the printing press stand 20, see FIG. 2, when the device 2 is moved between adjacent press stands in community style press array, for example.

Figure 3:
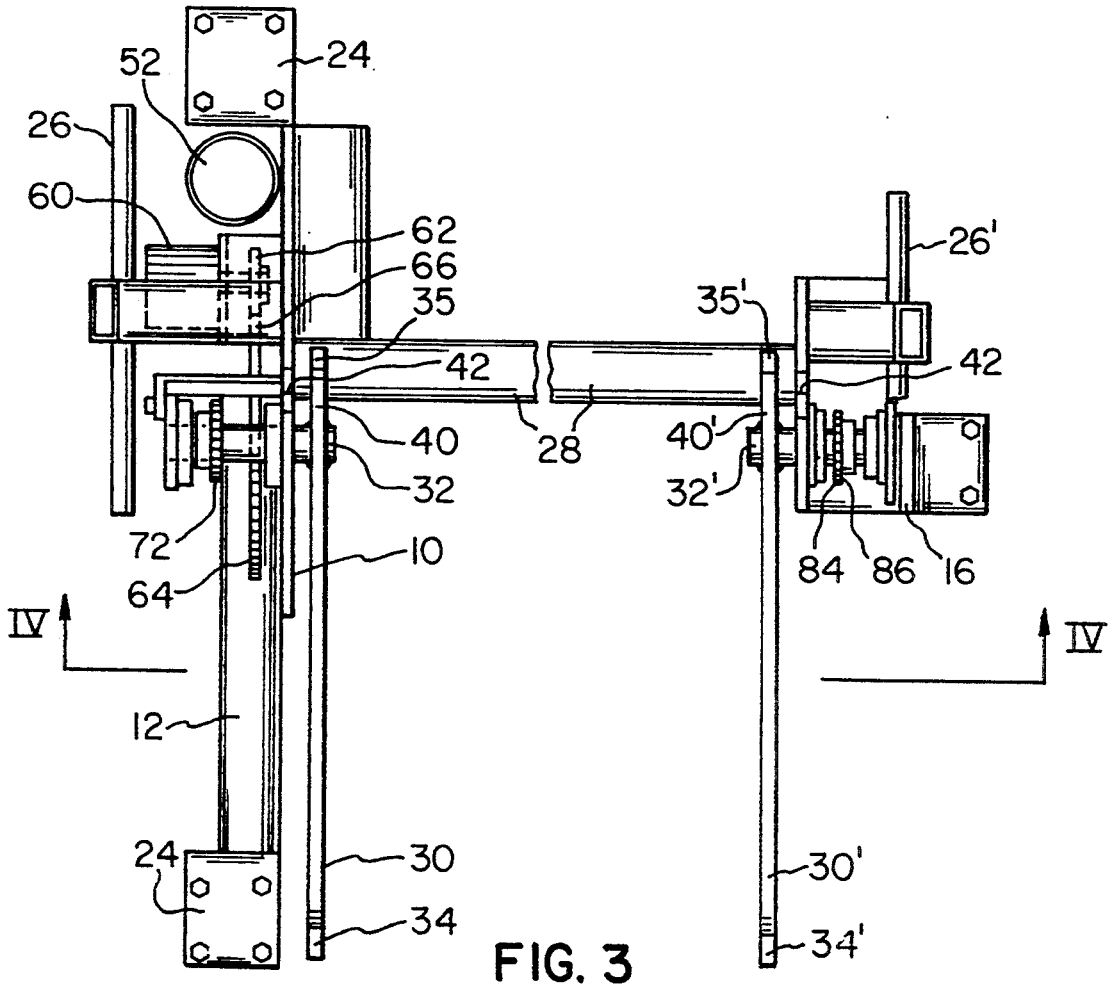
FIG. 3 is a top plan view of the roll transfer device of the invention.
Figure 4:
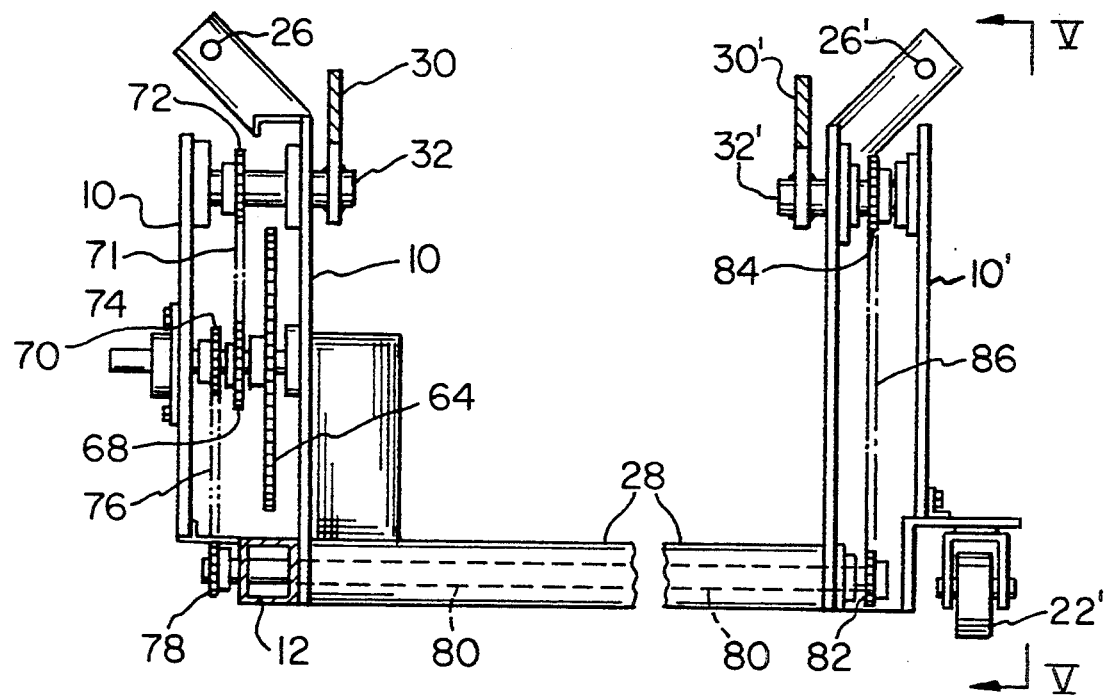
FIG. 4 is a front elevation of the roll transfer device viewed along lines IV—IV of FIG. 3.

The frame 8 includes two caster wheels 22 mounted at the beam ends 12 and 14 by way of angle braces 24 at the aisle side. A single caster wheel 22' is mounted on the far side frame segment 16. The caster wheels are rotatable 360° about a vertical axis to permit a full range of motion. A handle 26 is provided on the left-hand, aisle side mounted to the top of the upright support housing 10 to facilitate movement of the wheeled frame 8 along the shop floor. A like handle 26' is provided on the far side, see FIGS. 3 and 4.

A transverse beam member 28 extends between the bottoms of the upright support housings 10 and 10' to structurally integrate the right and left-hand segments of the frame 8.

Figure 2:
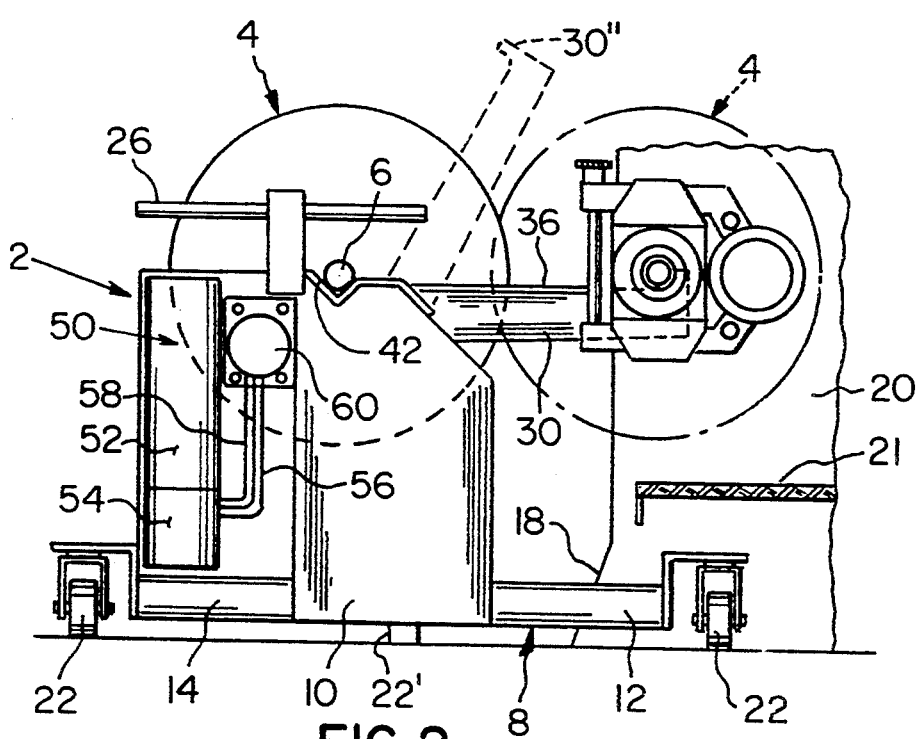
FIG. 2 is a left side elevation view of the transfer device of FIG. 1 shown adjacent a partially fragmented printing press.

Thus, it will be readily appreciated that the frame 8 assumes a very low profile to fit beneath structural elements of the mill stand 20, such as overhanging element 21, see FIG. 2. The elongated ends 12 and 14 of the outrigger beam of the frame 8 also provide a very stable base to resist tipping movements when a heavy roll 4 is being lifted.

The transfer device 2 includes a pair of lifting arms 30 and 30' pivotally mounted on stub shafts 32, 32' to the upright support housings 10 and 10', respectively. Each of the arms 30, 30' includes a raised retaining lug 34, 34', respectively, at a distal end and retaining lugs 35, 35' at a rearward end to provide stops for the roll shaft 6 for lifting and loading purposes, see FIGS. 6–8. The upper edges of the arms each have a rubber layer 36, 36' thereon. The rubber provides a degree of friction for the roll shaft 6 and causes the roll shaft to rotate along the arms (FIG. 8) rather than to slide therealong, which may otherwise occur with lower friction, metal-to-metal contact.

Figure 6:
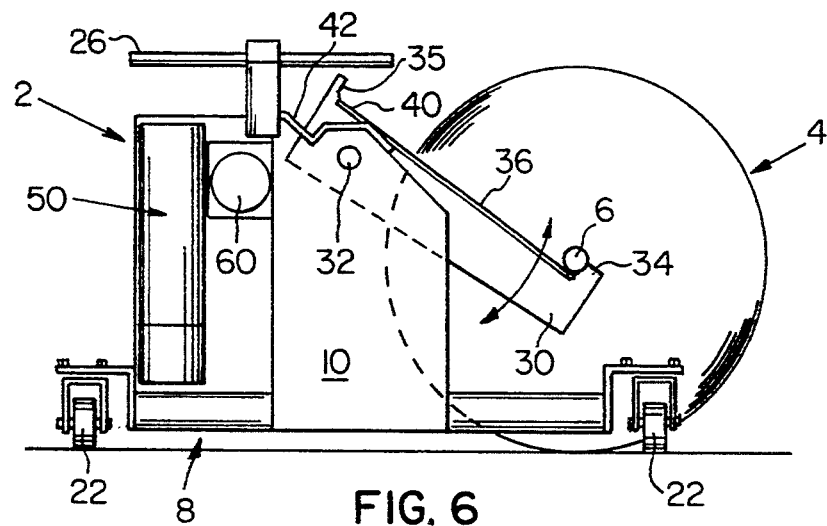
FIG. 6 is a side elevation view of the device of the invention shown in a pick-up position, about to lift a paper roll.
Figure 7:
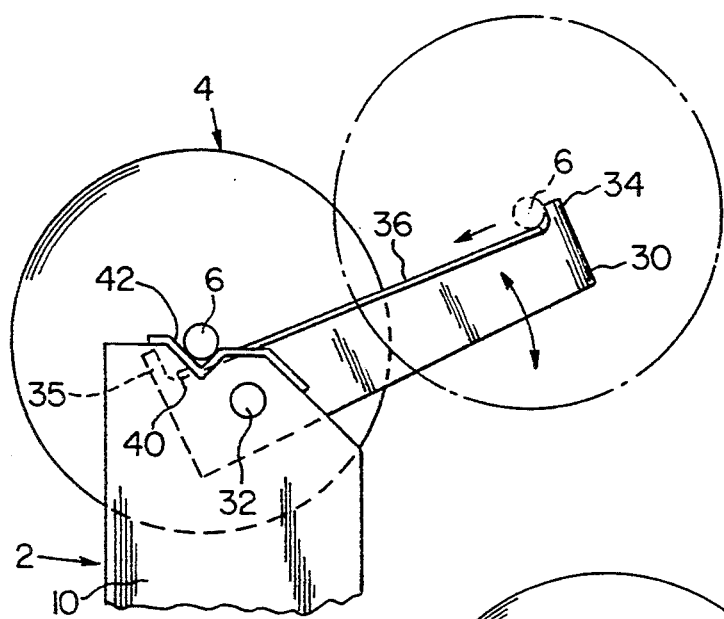
FIG. 7 is a partially fragmented, side view of the device of FIG. 6 showing the support arms in a raised, slightly exaggerated, roll loading position.
Figure 8:
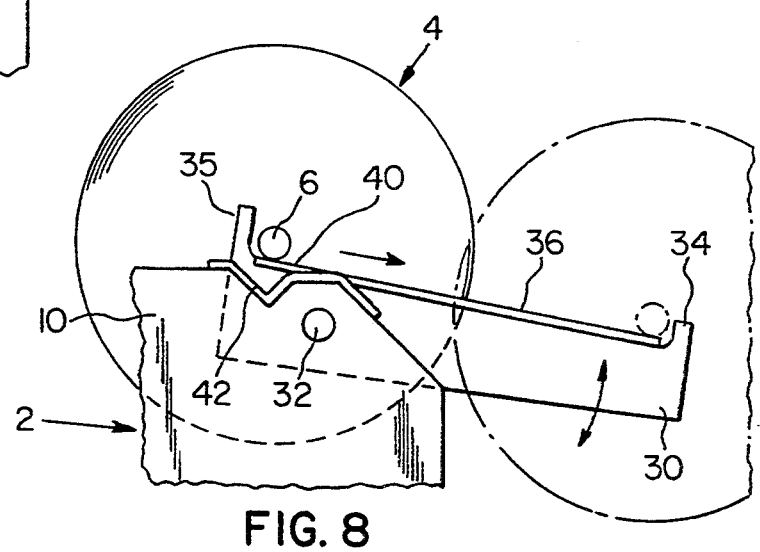
FIG. 8 is a view similar to FIG. 7 but showing the support arms in a lowered, roll unloading position.

The arms 30, 30' are mounted on the shafts 32, 32' such that a segment 40, 40' of the respective arms is located rearwardly of the shafts, see, particularly, FIGS. 6–8. The upright support housings 10, 10' each have a V-shaped notch defining respective shaft holders 42, 42' positioned in the tops thereof for supporting the paper roll shaft 6 therein. Still referring to FIGS. 6–8, the stub shafts 32, 32' for mounting the arms 30, 30' are positioned slightly below and forward of the shaft holders 42, 42'. It will be appreciated that the rear segments 40, 40' of the support arms move in the opposite direction than the arms 30, 30'. Hence, as seen in FIG. 7, as the arm 30 is raised, the rear segment 40 is lowered to guide the roll shaft 6 into the shaft holder 42 for secure transport on the device 2. Conversely, as seen in FIG. 7, when the arm 30 is lowered, the rear lug 35 and rear segment 40 raise to engage and lift the roll shaft 6 from the holder 42 and onto the arm 30 for unloading purposes. Simultaneous movement of the arm 30' also occurs to achieve a balanced movement of the roll shaft.

The arms 30, 30' are interconnected by appropriate chain drives and gearing to move simultaneously and with equal power. Considerable lifting torque is required, as can be appreciated, when, for example, a 1,400 pound paper roll is lifted. Lifting torques of 2,000 to 4,000 foot pounds are not uncommon. In addition, the arms 30, 30' can be moved to any position from ground level upwardly, to engage partial rolls of any size and weight typically used in printing presses of this type.

Figure 2A:
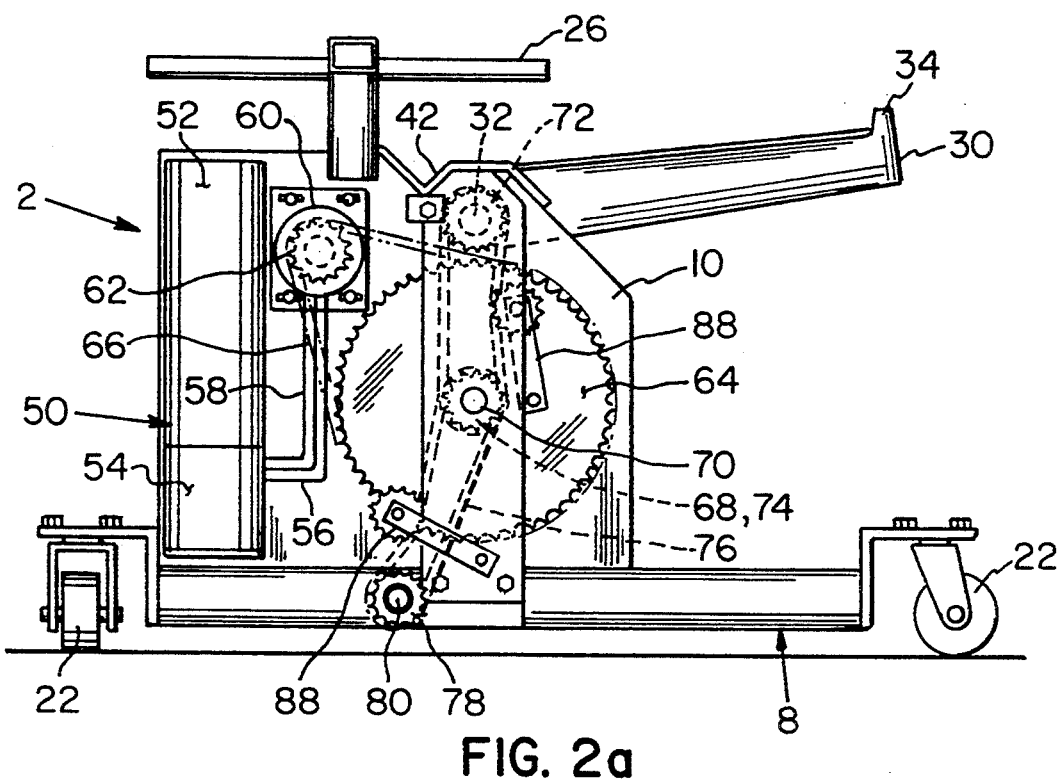
FIG. 2a is similar to FIG. 2 but showing a portion of the drive train.
Figure 5:
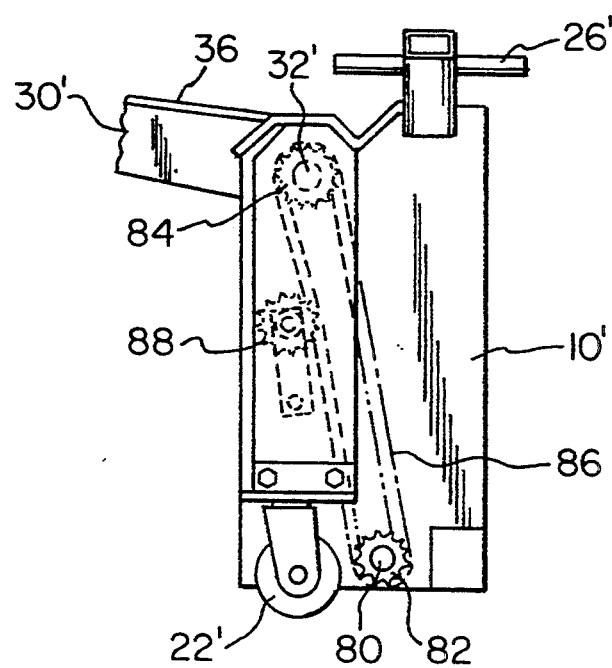
FIG. 5 is a right side elevation view taken along lines V—V of FIG. 4.

In order to meet the required power levels, a hydraulic drive 50 is provided, as seen in FIGS. 2a–5. The hydraulic drive 50 includes a hydraulic fluid reservoir 52 and an electric hydraulic pump 54. Hydraulic fluid travels in lines 56, 58, respectively, to and from a hydraulic motor 60. The drive shaft of the motor 60 turns a toothed drive gear 62 which turns a larger toothed gear 64 and shaft 70 by way of a drive chain 66. A first, central toothed gear 68 is attached to the shaft 70 and is rotated thereby. The first, central gear 68 is coupled by a chain 71 to a toothed upper gear 72 affixed to the stub shaft 32 of the arm 30, see also FIG. 4. A second, central toothed gear 74 of the same diameter as the first, central gear 68 is also fixedly attached to the shaft 70 to rotate at the same speed as the gear 68. The second, central gear 74 is coupled by way of a chain 76 to a lower toothed gear 78 of the same size as the upper gear 72 so as to match the speed and torque of the upper gear. The lower gear 72 is affixed to one end of a drive shaft 80 which extends between the upright support housings 10, 10' and is enclosed with the transverse box beam 28. The distal end of the drive shaft 80 carries a toothed, lower gear 82 which, in turn, is coupled to an toothed, upper gear 84 by a chain 86. Conventional chain tensioning devices, such as the chain deflectors 88, shown in FIGS. 2a and 5, are employed where necessary to maintain proper tension between the chain drives and the gears. The upper gear 84 is affixed to the stub shaft 32' to move the attached arm 30'. Hence, it is seen that by use of appropriately matched gearing and chain drives, the arms 30 and 30' move in unison and are powered with equal, lifting torque.

The roll transfer device 2 is adapted to lift a paper roll 4 from the floor, as shown in FIGS. 6 and 7, or to transfer a roll to or from a roll stand as depicted in FIGS. 2 and 8. In the pick-up or loading mode of operation of FIGS. 6 and 7, the paper roll shaft 6 initially engages the end stops 34, 34' of the arms 30, 30'. The roll shaft 6 then rotates along the rubber layer 36 as the arms are raised by activation of the hydraulic drive system 50. When the arms 30, 30' pass a horizontal plane and reach the position of FIG. 7, the roll shaft 6 is nested in the shaft holders 42. In this position, the roll is supported in a very stable and balanced manner and may be safely transported on the device 2. In order to enter or exit the confined space between adjacent roll stands 20 with the transfer device 2, it is necessary to position the arms 30, 30' in a somewhat vertical position, as indicated by phantom arms 30" shown in FIG. 2. In order to clear the paper roll 4' loaded on roll stand 20 in FIG. 2, it is necessary for the raised arms 30" to assume an angle of at least 60° in the exiting or entry modes.

When a paper roll is to be unloaded from the transfer device 2 and loaded into the roll stand 20, as shown in FIGS. 2 and 8, the arms 30 and 30' are gradually lowered from the 30" position by way of the hydraulic drive 50. As previously described, the rear arm retaining lugs 35, 35' and rear segments 40 and 40' respectively engage and lift the roll shaft 6 out of the shaft holders 42 as the arms 30, 30' are lowered. The arms 30, 30' are gradually moved to a position slightly lower than horizontal, causing the roll shaft 6 to rotate along the rubber layer 36 of the arms outwardly to the roll stand 20. This controlled movement of the paper roll 4 continues until the shaft 6 reaches the shaft mounts (not shown) of the stand 20. When the roll shaft 6 is supported by the stand 20, the arms 30, 30' are lowered slightly to allow the raised stops 34 at the ends of the arms to clear the shaft 6. The transfer device 2 is then moved rearwardly away from the stand 20, and the arms are raised to the position 30" of 60° or more to clear the mounted roll 4'. The handle 26 is grasped and the device 2 is pulled outwardly from the confined space and may be then moved to a next press stand where another paper roll is to be loaded or unloaded.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

I claim:

1. A roll transfer device comprising:

a transportable frame means;

a pair of spaced-apart, upright support housings mounted on the frame means;

a roll shaft holder means on said support housings adapted to support a roll shaft;

a pair of arms, each arm pivotally mounted on one of said support housings, said arms adapted to engage opposed ends of a roll shaft of a roll and to lift said roll as said arms are raised, each of said arms including a rear segment extending in a rearward direction from said pivotal mounting location to permit said rear segments to travel past said roll shaft holder means when said arms are raised or lowered, wherein the arms include a layer of rubber material along an upper surface thereof adapted to engage the roll shaft and cause the roll shaft to rotate therealong as the arms are moved; and drive means to move the arms between a lowered position and a raised position whereby a roll is engaged along the roll shaft by said arms and moved to the roll shaft holder means when said arms are raised, and thereafter the roll shaft is moved from said holder means by said rear segments when the arms are lowered.

2. The roll transfer device of claim 1 wherein the transportable frame means includes an elongated outrigger beam member located on a first frame side affixed to one of said upright support housings, said outrigger beam member having a pair of caster wheels attached thereto;

said frame means including a frame segment located on a second frame side, said frame segment of a shorter dimension than said outrigger beam members and attached to the other of said upright support housings, said shorter frame segment having at least one caster wheel attached thereto; and a transverse beam member extending between and attached to said upright support housings.

3. A roll transfer device comprising:

a transportable frame means;

a pair of spaced-apart, upright support housings mounted on the frame means, wherein the frame means includes a transverse beam member having an open interior portion extending between and attached to the upright support housings;

a roll shaft holder means on said support housings adapted to support a roll shaft;

a pair of arms, each arm pivotally mounted on one of said support housings, said arms adapted to engage opposed ends of a roll shaft of a roll and to lift said roll as said arms are raised, each of said arms including a rear segment extending in a rearward direction from said pivotal mounting location to permit said rear segments to travel past said roll shaft holder means when said arms are raised or lowered; and drive means to move the arms between a lowered position and a raised position whereby a roll is engaged along the roll shaft by said arms and moved to the roll shaft holder means when said arms are raised, and thereafter the roll shaft is moved from said holder means by said rear segments when the arms are lowered, and wherein the drive means includes a drive shaft rotatably positioned within the open interior portion of the transverse beam.

4. The roll transfer device of claim 3 wherein the drive means further comprises:
   a hydraulic motor means positioned on the frame means adjacent a first of the upright support housings;
   a pair of shaft means for mounting each of the arms to a respective upright support housing;
   first chain and gear means operably coupling the hydraulic motor means to the shaft means on the first upright support housing;
   second chain and gear means operably coupling the hydraulic motor to a first end of the drive shaft at the first upright support housing; and
   third chain and gear means operably coupling a second end of the drive shaft to the shaft means on a second of the upright support housings, whereby the arms move simultaneously, responsive to said hydraulic motor means.

5. The roll transfer device of claim 3 wherein said frame means has a shaped profile of a configuration permitting entry into a confined space between a pair of printing presses and wherein said arms are moveable to a raised position of at least 60° from a horizontal plane to provide further clearance with said printing presses.

6. The roll transfer device of claim 5 wherein the frame means includes a first, longer frame segment supported by two caster wheels and a second, shorter frame segment supported by one caster wheel and wherein said first and second frame segments are interconnected by a transverse beam member.

7. A roll transfer device comprising:
   a frame means including a first frame segment supported by wheels, a second frame segment spaced from said first segment supported by at least one wheel, a transverse beam member extending between said first and second frame segments;
   first and second upright support housings, respectively mounted on said first and second frame segments, roll shaft holder means on the first and second upright support housings;
   a pair of arms each affixed to a shaft pivotally mounted on the respective first and second upright support housings adjacent said roll shaft holder means, each of said arms including a rear segment extending in a rearward direction from the shaft and extending in an area of said roll shaft holder means;
   each of said arms also including a stop lug means located at a forward end and a stop lug means at a rearward end thereof; and
   hydraulically actuated drive means supported on the frame means to move the arms simultaneously from a lowered position below a horizontal plane to a raised position greater than about 60° above the horizontal plane, whereby in use, said arms are adapted to engage opposed ends of a shaft laterally extending from a roll situated between said arms and said arms are further adapted to raise said roll and to rotatably move said roll shaft therealong to a loaded position in said roll shaft holder means and, thereafter, upon lowering said arms, to cause said rearward stop lug means and the rear segments to engage and lift said roll shaft out of engagement with the roll shaft holder means and permit said roll shaft and roll to rotatably move along the arms as said arms are further lowered past the horizontal.

8. The roll transfer device of claim 7 wherein the arms include a rubber layer disposed along an upper roll shaft contacting surface to increase a coefficient of friction of said surface to minimize slippage and to cause said roll shaft to rotate therealong.

9. The roll transfer device of claim 7 wherein said drive means includes a rotatable drive shaft extending between said first and second upright support housings and positioned within the transverse beam member of the frame means.

10. The roll transfer device of claim 9 wherein the hydraulically actuated drive means includes a hydraulic motor coupled to a chain driven gear power train, including a toothed gear affixed to each of the arm shafts and a chain for driving each of said shaft affixed gears for moving said arms.

* * * * *